United States Patent
Svensson

[11] Patent Number: 5,706,718
[45] Date of Patent: Jan. 13, 1998

[54] RETHERMALIZER WITH EXPANSIBLE RACK

[75] Inventor: S. Alfred Svensson, Cincinnati, Ohio

[73] Assignee: Falcon Fabricators Inc., Batavia, Ohio

[21] Appl. No.: 663,388

[22] Filed: Jun. 13, 1996

[51] Int. Cl.[6] .............................. A47J 27/62; A47J 27/00
[52] U.S. Cl. .................. 99/416; 99/426; 99/449; 99/483
[58] Field of Search .................... 99/402, 410, 413, 99/414, 426, 449, 403, 416, 483; 211/11, 46

[56] References Cited

U.S. PATENT DOCUMENTS

| | | |
|---|---|---|
| 892,638 | 7/1908 | Wilson ..................................... 99/410 |
| 2,975,698 | 3/1961 | Miller ..................................... 99/402 X |
| 4,090,438 | 5/1978 | Luna . |
| 4,181,073 | 1/1980 | Chapa, Sr. . |
| 4,494,453 | 1/1985 | Bentson . |
| 5,097,759 | 3/1992 | Vilgrain et al. . |
| 5,265,523 | 11/1993 | Mino et al. . |
| 5,601,011 | 2/1997 | Minari et al. ..................................... 99/403 X |

FOREIGN PATENT DOCUMENTS

| | | | |
|---|---|---|---|
| 276438 | 7/1914 | Germany | 99/449 |
| 2245816 | 5/1973 | Germany | 99/402 |

*Primary Examiner*—Reginald L. Alexander
*Attorney, Agent, or Firm*—Wood, Herron & Evans, L.L.P.

[57] ABSTRACT

An expansible rack for holding food pouches within a rethermalizer unit includes a pair of side members pivotally connected at their lower end portions to a bottom member, the upper end portions of the side members having support pins for supporting the rack from the top edge of a reservoir in a rethermalizer unit. The pivotal connections of the side members with the bottom member permit the side members to be rotated toward and away from one another, thereby providing the capability of adjusting the rack to accommodate variously sized food pouches between the side members. A rethermalizer unit for use with the rack includes a plurality of notches disposed around the perimeter of the top edge of the reservoir. The support pins of the rack are placed in notches selected according to the desired spacing of the side members to accommodate the food pouch contained therebetween.

26 Claims, 3 Drawing Sheets

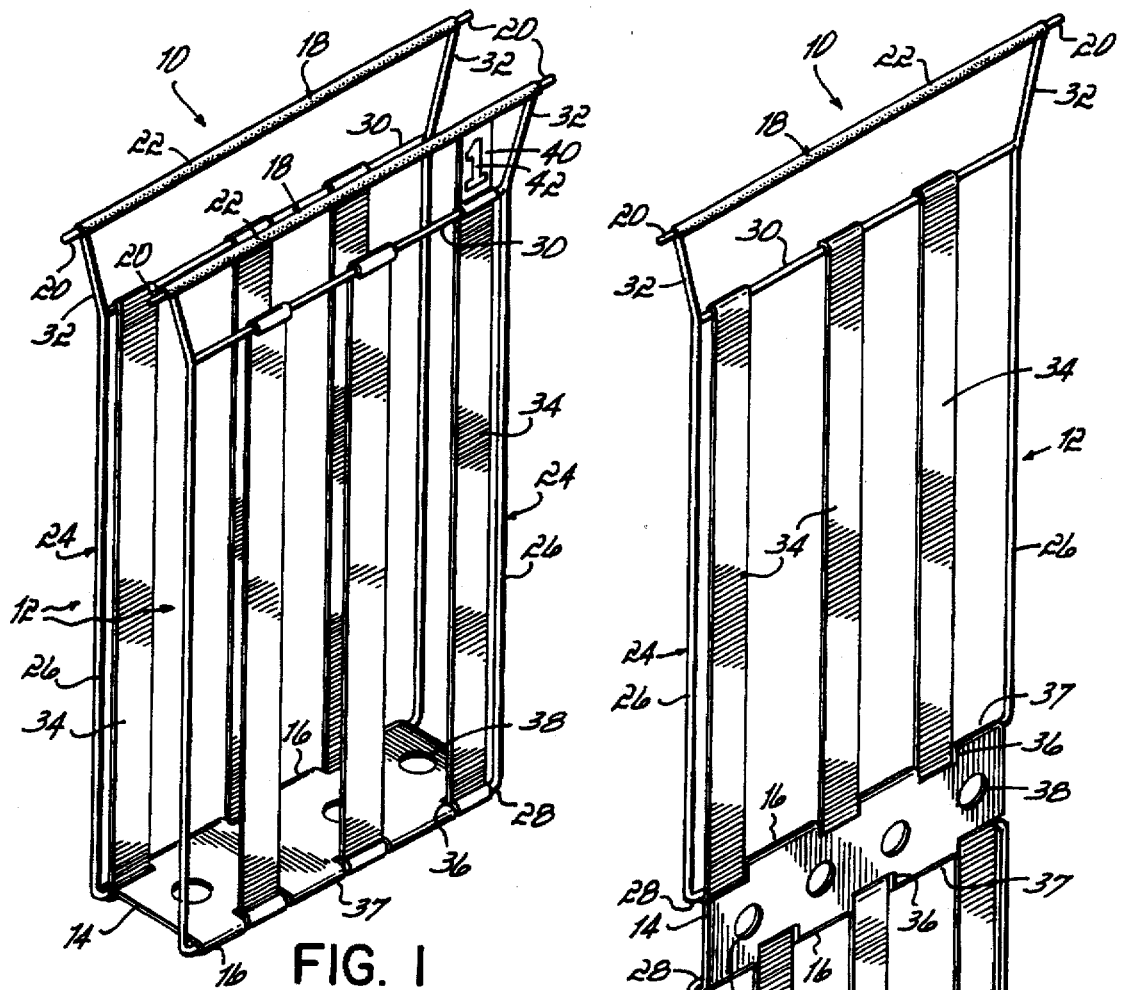
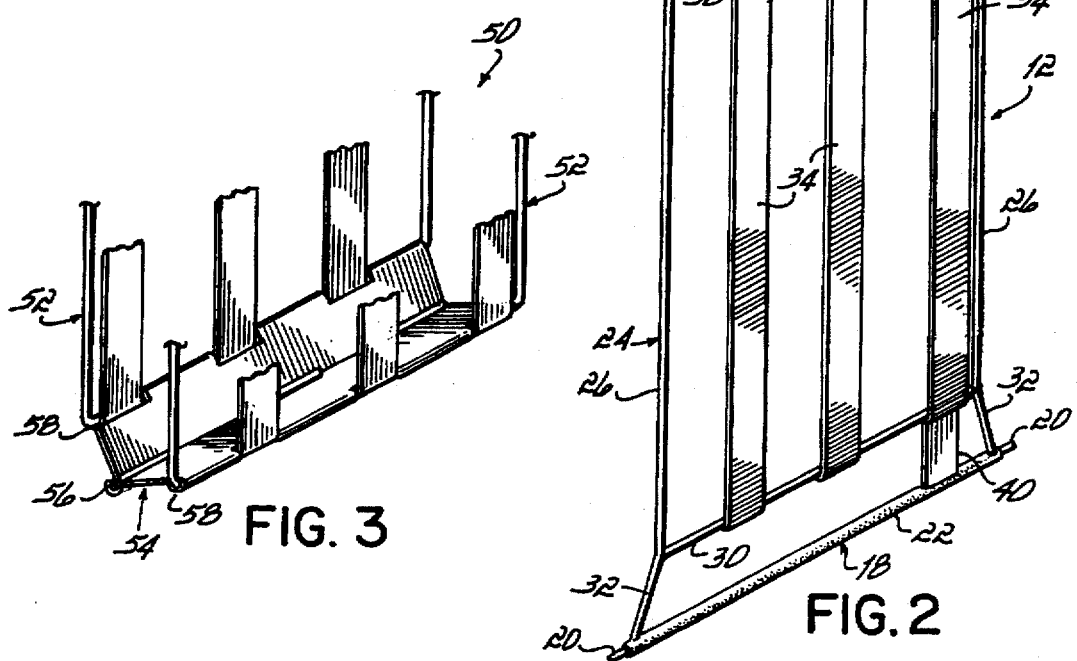

RETHERMALIZER WITH EXPANSIBLE RACK

FIELD OF THE INVENTION

The present invention relates to rethermalizer units for reheating precooked foods sealed in plastic pouches, and more particularly, to rethermalizers having racks for holding such food pouches in the units for quick and efficient reheating.

BACKGROUND OF THE INVENTION

A food processing method known as "cook-chill" has in recent years become a popular way of preparing certain foods in large quantities, such as for schools and hospitals, and most recently, for convenience food stores. According to the cook-chill process, various foods, such as pastas, soups, vegetables, and processed meats, are pre-cooked and are then sealed in thermoplastic pouches. The pouches are then quickly frozen, and shipped to the various food-service establishments in a frozen state. The foods can then be reheated as needed. The cook-chill process provides the ability to control portions accurately, reduces the need for skilled cooks, and is generally a quick and convenient way to prepare high-quality foods.

Reheating of cook-chill food pouches has conventionally been accomplished, particularly in establishments using substantial amounts of such foods, with units known as "rethermalizer" units. A conventional rethermalizer unit has a large container or reservoir for holding water, and a heater for heating the water. The reservoir is large enough to accommodate several food pouches simultaneously.

A rethermalizer unit must meet a number of criteria in order to assure a safe and flavorful product. First, according to government regulations currently in force, the temperature of the food being reheated must pass through the bacterial growth zone from 45 degrees Fahrenheit to 165 degrees Fahrenheit within a maximum of 120 minutes in order to control bacterial growth. The faster the food passes through this zone, the better bacterial growth will be controlled. Second, once the food reaches 170 degrees Fahrenheit, the rethermalizer must maintain the food between 170 and 180 degrees.

In conventional rethermalizer units, there may be elements for holding the individual food pouches apart from one another so that the heated water can circulate around all sides of each pouch for uniform reheating of the food. These elements often include some means of partitioning the reservoir into individual compartments. A single food pouch is placed in each partitioned compartment. The partitions may consist of metal dividers that are rigidly affixed to the inside walls of the reservoir for permanently partitioning the reservoir into fixed compartments. The dividers have holes to allow water to circulate around the food pouches. Alternatively, some rethermalizer units employ removable baskets of fixed size and shape for holding individual food pouches. Still others have rack units which include wire partitions for separating individual pouches from each other.

Disadvantages of these conventional partitioning elements include their lack of versatility in accommodating pouches of different sizes and shapes. For example, food pouches in the frozen state are quite rigid and often do not conform to the size and shape of the conventional fixed compartments used in existing rethermalizer units. The result is frequently that the frozen food pouch either cannot fit at all into an available compartment, or sits in the compartment in such a way that the pouch is not fully immersed in the water. This can result in the food being heated more slowly than is desired or required by regulations. Even when the pouches are only refrigerated, different food pouches may be formed with different sizes and shapes. However, it may be desirable to heat them together. Since prior partitioning units have been made with fixed dimensions for holding specific pouch sizes, simultaneously accommodating different pouch sizes has been difficult.

Furthermore, with prior partitioning units or racks, even when the food pouch fits easily within the compartment or rack, the pouch has a tendency to float around within the space allotted to it. Moreover, once the food has thawed, the food tends to settle toward the bottom of the pouch, causing the pouch to be rather thick. The tendency of the pouch to assume a thick shape results in longer reheating times, because the heat has to penetrate a greater thickness of food product.

Past devices have also failed to provide an accurate method of tracking how long each pouch has been in the rethermalizer. This is a significant problem in view of the stringent requirements relating to bacterial growth and food temperature noted previously.

Accordingly, there is a need in the rethermalizer industry for accommodating variously sized frozen food pouches within a rethermalizer reservoir for quick and efficient reheating. There is a further need to provide the user with an accurate and convenient manner to track the reheating duration of each pouch.

SUMMARY OF THE INVENTION

The present invention overcomes the drawbacks inherent in conventional rethermalizer units noted above. In accordance with the principles of the present invention, a unique rethermalizer and rack system is provided which permits variously sized food pouches to be held within a reservoir of a rethermalizer unit for rapid and efficient reheating. Also, each rack includes indicia allowing the user to track the amount of time the pouch has been in the rethermalizer.

A rack embodying the present invention includes a pair of side members with at least one being pivotally connected to a bottom member. Each side member includes support elements at the upper end of the side member for hanging the rack within the rethermalizer. The rack is positioned within a reservoir of a rethermalizer unit with the support elements resting on the upper perimeter of the reservoir. Preferably, notches are spaced apart along substantially the entire perimeter of the reservoir for holding the rack support elements. The support elements are preferably pins extending outwardly in opposite directions at the top of each side member. The bottom member is preferably an apertured plate.

A food pouch is placed between the side members of the rack, with the bottom member supporting the pouch in the vertical direction. By virtue of the pivotal connections between the side members and the bottom member, the side members may be rotated toward or away from one another so as to decrease or increase the distance between the side members at a given height above the bottom member. In this way, the rack can be narrowed for narrow food pouches, or widened when necessary to accommodate wider food pouches. The continuous series of notches surrounding the top of the reservoir provides the ability to vary the width of the rack so that it is opened up only as far as needed to accommodate the particular food pouch being reheated, thereby minimizing reservoir space used and permitting a greater number of such racks to be simultaneously immersed in the reservoir. Rapid reheating of the food is accomplished by placing the two side members of the rack as close together as possible, so that the food pouch is squeezed between the side members. If the food pouch is initially frozen, the rack is adjusted once the food thaws, to move the side members toward one another in order to squeeze the pouch into as thin a shape as possible. The thin profile of the pouch results in shorter reheating time, since the heat does not have to penetrate as deeply.

Advantageously, the upper ends of the side members have handles to facilitate lowering and raising of the rack into and out of the reservoir. The support pins for hanging the racks preferably extend outwardly from the handles. The handles are coated with thermal insulating material, such as plastic or rubber, to keep the handles comfortable to the touch when the rack is immersed in heated water. Furthermore, like the bottom member, the side members preferably have apertures to permit heated water to circulate more effectively around the food pouch. Finally, each side member includes indicia, such as a number, for allowing the user to track the time that the rack has been in the rethermalizer.

Each side member more specifically comprises a rectangular frame having first and second crosswise rods and first and second lengthwise rods. The lengthwise rods extend beyond the first crosswise rod. A plurality of metal slats are spaced apart and joined at their opposite ends to the first and second crosswise rods. A third crosswise rod is joined to the extended ends of the lengthwise rods with the ends of the third crosswise rod extending beyond the lengthwise rods serving as the support pins for the rack. The portion of the third crosswise rod between the lengthwise rods serves as the handle.

A rethermalizer unit according to the present invention includes a cabinet or housing with a reservoir supported within the housing and having its open end accessible through an opening in a top side of the housing. A heater is mounted below the reservoir within the housing and is connected to the reservoir via inlet and outlet ports in the reservoir. The heater continuously receives lower temperature water through the outlet port and heats the water to a higher temperature. The higher temperature water then flows upwardly by convection action into the reservoir through the inlet port. A plurality of notches are spaced apart on the upper surface of the top side of the housing, the notches surrounding substantially the entire perimeter of the reservoir opening. At least one rack is hung within the reservoir. The rack includes a pair of side members pivotally connected to opposite edges of a bottom member and support pins at the upper end of each side member. The support pins rest in the notches at the top of the reservoir.

A rethermalizer unit according to the present invention preferably also includes one or more notched or serrated rails traversing the open top end of the reservoir, thereby subdividing the reservoir into two or more sections each of which may accommodate one or more racks according to the invention. This also allows racks of more than one width to be simultaneously placed into the reservoir, giving the rethermalizer unit added flexibility for reheating variously sized food pouches.

The present invention thus provides a versatile rethermalizer rack able to accommodate food pouches of various sizes for quick and efficient reheating in a rethermalizer unit. An improved rethermalizer unit incorporating racks according to the present invention is also provided.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

FIG. 1 is a perspective view of one preferred embodiment of a rack according to the present invention, showing the rack in a folded position as when it is in use in a rethermalizer;

FIG. 2 is a perspective view of the rack of FIG. 1 opened up so that it is flat;

FIG. 3 is a partial perspective view of an alternative embodiment of a rack according to the present invention, showing the bottom portion of the rack in a folded position;

DETAILED DESCRIPTION OF SPECIFIC EMBODIMENTS

Figure 4:
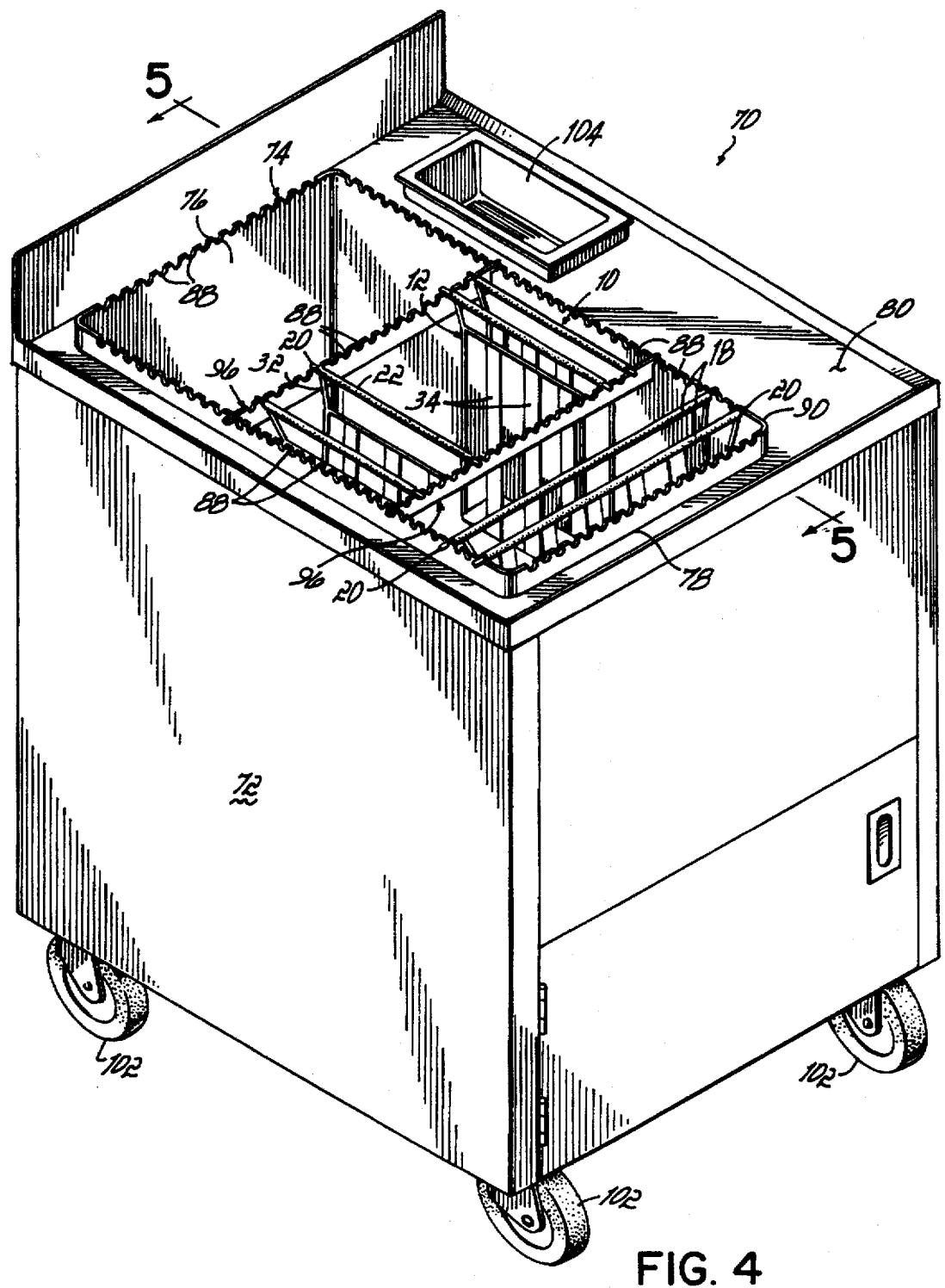
FIG. 4 is a perspective view of a rethermalizer unit according to a preferred embodiment of the present invention.

With reference to FIG. 1, a rethermalizer rack 10 includes a pair of side members 12 and a bottom member 14. The bottom member 14 is pivotally connected to the side members 12 along opposite edges 16 of bottom member 14. Thus, as shown in FIGS. 1 and 2, the side members 12 can be rotated with respect to each other and the bottom member 14. FIG. 2 depicts the side members 12 rotated until the side members 12 and bottom member 14 lie in a single plane. In use, however, the rack 10 assumes a configuration more like that shown in FIG. 1, so that a food pouch may be inserted between the side members 12.

The rack 10 of FIGS. 1 and 2 further includes handles 18 to facilitate lowering and raising of the rack 10 into and out of a rethermalizer unit. The rack 10 also includes support pins 20 that are engageable with notches on a rethermalizer unit so as to suspend the rack 10 within the reservoir of the unit, as described in greater detail below in connection with FIGS. 4 and 5. As shown in FIGS. 1 and 2, the handle 18 and support pins 20 for each side member advantageously are formed from an integral metal rod, with the ends of the rod constituting the support pins 20 and the middle portion of the rod constituting the handle 18. In addition, each handle 18 advantageously has a plastic or rubber-like coating or sleeve 22. The coating 22 has a low thermal conductivity and low heat capacitance relative to that of the metal rod of the handle in order to maintain the handle 18 at a low enough temperature that it will not burn the hand of a person raising the rack 10 out of the hot water in the rethermalizer.

With further reference to FIGS. 1 and 2, the rack 10 is preferably constructed in the following manner. For each side member 12, a rectangular frame 24 is formed from a length of metal rod bent into a three-sided configuration having two parallel lengthwise members 26 of equal length and a lower crosswise member 28 normal to the lengthwise members 26. An upper crosswise member 30 comprising a second length of metal rod is welded or otherwise affixed to the lengthwise members 26 spaced apart from and parallel to the lower crosswise member 28 so that the ends 32 of the lengthwise members 26 extend beyond the upper crosswise member 30. A third crosswise member or handle 18 comprising a length of metal rod is welded or otherwise affixed to the ends 32 of the lengthwise members 26 parallel to the upper crosswise member 30. The length of the rod used for the handle 18 is greater than the length of the upper crosswise member 30 so that the ends 20 of the handle 18 extend beyond the lengthwise members 26, the ends 20 thereby serving as support pins for the rack 10. Advantageously, the handle 18 has a coating 22, as described above, along at least a portion of its length between the lengthwise members 26. The coating 22 is preferably applied prior to affixing the handle 18 to the ends 32 of the lengthwise members 26. Each side member 12 is completed by attaching a plurality of metal slats 34 between the lower crosswise member 28 and the upper crosswise member 30. The slats 34 are spaced apart and parallel, and may be attached to the crosswise members 28 and 30 by crimping the ends around the members 28 and 30 as shown in FIGS. 1 and 2, or by other suitable means such as welding.

The bottom member 14 of the rack 10 is made from a rectangular metal plate having notches 36 along opposite edges 16. The notches 36 correspond in size and location to the attachment points of the slats 34 when the bottom member 14 is connected to the side members 12, so as to prevent interference between the plate 14 and the slats 34 when the side members 12 are rotated with respect to the plate 14. The portions 37 of the plate 14 adjacent to the notches 36 are loosely crimped around each of the lower crosswise members 30 of the side members 12 to form a hinge so that the side members 12 can freely rotate with respect to the bottom member 14. Preferably the bottom member 14 has one or more apertures 38 to permit hot water to pass through and thereby aid circulation of hot water around a food pouch contained between the side members 12. The spaces between the slats 34 of the side members 12 likewise aid circulation of hot water around the pouch. Finally, as shown in FIGS. 1 and 2, the rack 10 may also include a plaque 40 bearing a unique number or other indicium 42 to aid in differentiating between several racks 10 simultaneously used within a rethermalizer. For instance, the racks may each have a different number corresponding to the time the rack was placed in the rethermalizer, thereby helping the cook ensure that each food pouch is reheated for the proper amount of time.

Various other construction methods or designs may alternatively be used. For instance, the frame 24 for a side member 12 may be constructed from four separate lengths of metal rod welded or otherwise affixed to one another. Rods may be used instead of slats 34. Various materials other than metal may be used for the components of the rack. Persons of ordinary skill in the art may readily discern other modifications to the rack 10 that are within the scope of the present invention.

For example, an alternative embodiment of a rack 50 is depicted in FIG. 3. The side members 52 are constructed identically to the side members 12 of the rack 10 of FIGS. 1 and 2 and are connected to the bottom member 54 in the same manner. The alternative rack 50, however, has an articulated bottom member 54 that has a hinge 56 midway between the edges 58. The hinge 58 permits the bottom member 54 to be made effectively wider or narrower and thus permits the distance between the side members 52 to be increased while keeping the side members 52 closer to parallel, thereby keeping the handles closer together and taking up less width at the top of the reservoir. Advantageously, the articulated bottom member 54 is made to be wider (as measured when the plate 54 is laid flat) than the bottom member 14 of the rack 10. For narrow food pouches, the plate 54 may sag into a narrow V-shaped configuration, while for wider food pouches the plate 54 may sag to a lesser extent, assuming a wider V-shaped configuration.

A still further alternative design for a rack includes a nonarticulated bottom member with articulated side members. Each side member comprises two sections that are pivotally connected along a line parallel to and spaced apart from the respective edge 16 of bottom member 14, with each side member also pivotally connected at its lower end to the edge 16 as with the rack 10 of FIG. 1. Other alternative rack designs according to the principles of the present invention will occur to persons of ordinary skill in the art.

Figure 5:
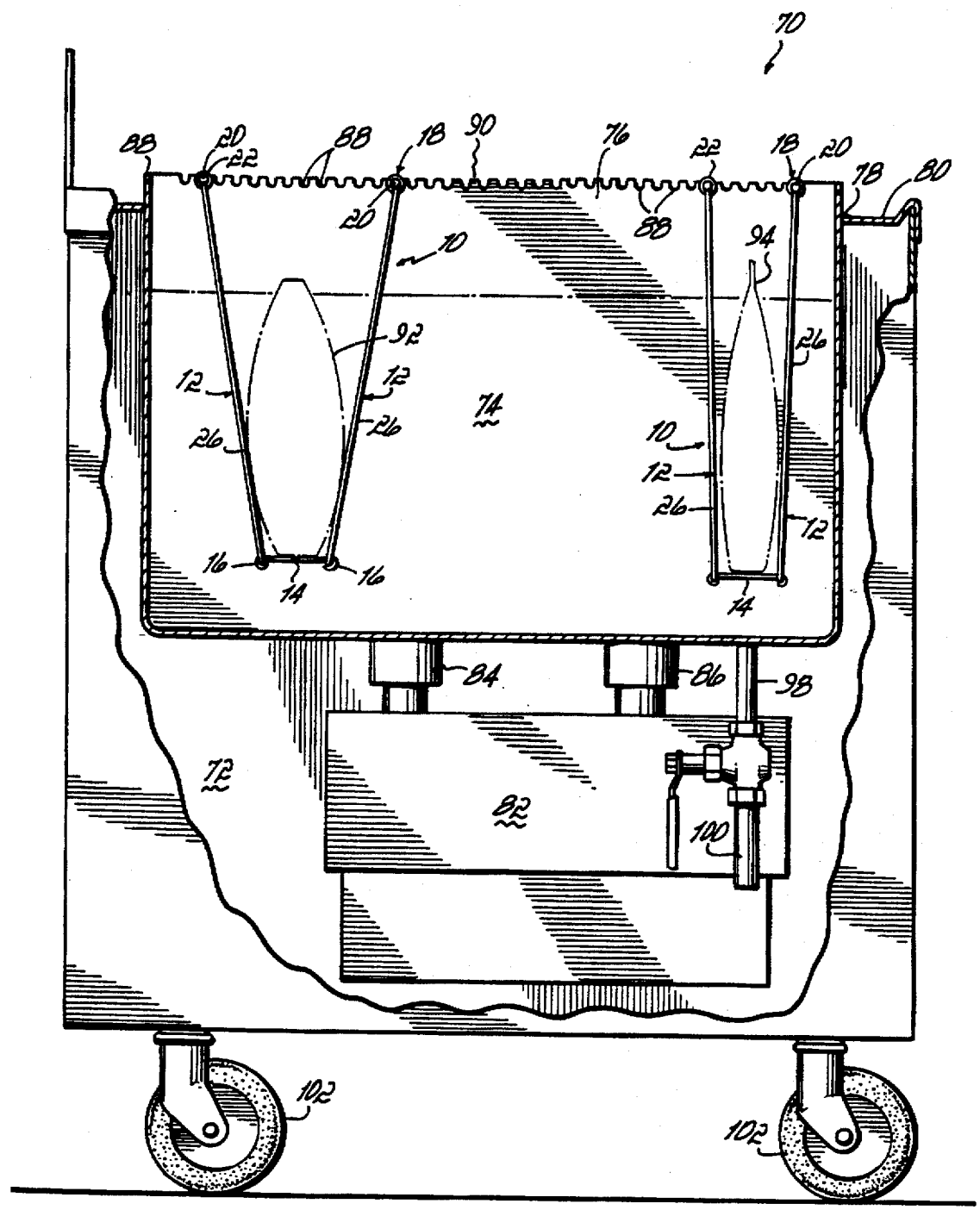
FIG. 5 is a cut-away view of the rethermalizer unit of FIG. 4 taken along the line 5—5 in FIG. 4, showing two rethermalizer racks according to the present invention suspended within the reservoir of the rethermalizer, and illustrating the ability to vary the pouch-receiving space of the racks.

A rethermalizer unit according to the present invention is depicted in FIGS. 4 and 5. With reference to FIGS. 4 and 5, the rethermalizer unit 70 includes a housing 72, a reservoir 74 mounted within the housing 72 with the open top end 76 of the reservoir accessible through an opening 78 in the top surface 80 of the housing 72, a heater/pump unit 82 mounted within the housing 72 below the reservoir 74, an outlet port 84 in the reservoir 74 through which the heater/pump 82 receives lower temperature water, and an inlet port 86 through which the heater/pump 82 supplies higher temperature water to the reservoir 74. The heater/pump 82 continuously recirculates water out of and into the reservoir 74, adding heat as needed to maintain the water temperature in the reservoir at a preselected level.

The rethermalizer 70 further includes a plurality of notches 88 regularly spaced apart along at least a portion or portions of the perimeter of the open top 76 of the reservoir 74. Preferably, the notches 88 surround substantially the entire perimeter of the open top 76 of the reservoir 74. The notches 88 may be formed in a top edge or lip 90 of the reservoir itself, as shown in FIGS. 4 and 5, or alternatively may be formed in the top surface 80 of the housing 72 if the top of the reservoir 74 is flush with or recessed below the top surface 80 of the housing 72. Yet another alternative is to secure notched rails to the top surface 80 around the perimeter of the reservoir 74. The notches 88 are used for holding one or more racks 10 of the type described above in connection with FIGS. 1 and 2. The racks 10 are suspended within the rethermalizer reservoir 74 with the support pins 20 resting in the notches 88. As depicted in FIG. 5, the racks 10 may be widened to accommodate a larger food pouch 92, or narrowed to accommodate a smaller food pouch 94.

The rethermalizer 70 advantageously also includes notched rails 96 traversing the open top end 76 of the reservoir 74, thereby subdividing the reservoir 74 into sections and permitting racks 10 to be suspended in different orientations. Furthermore, with the rails 96, racks 10 of different transverse extent may be suspended within the reservoir 74, as shown in FIG. 4, so that smaller food pouches can be placed in racks of shorter transverse extent while larger food pouches can be placed in racks of longer transverse extent. The rails 96 may be made so that they engage the notches 88 in the top lip 90, permitting the rails 96 to be removed when not needed or to be rearranged if desired.

The rethermalizer 70 may also be provided with a drain line 98 and shut-off valve 100 for draining water from the reservoir 74. The drain line 98 can also be used for filling the reservoir by attaching a water supply source to the line 98 and opening the valve 100. Preferably, the rethermalizer 70 is mounted on wheels 102 for portability. It may also have one or more compartments or basins 104 for holding food preparation utensils, condiments, or the like.

In use, the reservoir 74 is filled with water and the heater unit 82 is turned on. When the water in the reservoir reaches a predetermined level, generally the rethermalizer 70 is ready to be used. To meet the aforementioned regulatory requirements, the water temperature preferably should be allowed to reach approximately 160 degrees Fahrenheit. A frozen food pouch is then placed between the side members 12 of a rack 10, the rack 10 is lowered into the water by means of the handles 18, and the support pins 20 at the ends of the handles 18 are placed within suitable notches 88 such that the handles 18 are as close together as possible so that the food pouch is squeezed firmly between the side members 12. Other racks 10 carrying other food pouches may be similarly placed within the rethermalizer 70. If the racks 10 are placed in the rethermalizer 70 at different times, the indicia 42 may be used to keep track of when each rack was placed in the rethermalizer. The racks 10 are left in the hot water for a predetermined amount of time to assure proper serving temperature. If desired, the racks may be adjusted during the reheating process to maintain firm squeezing of the pouches. Once the predetermined amount of time has elapsed, the racks are removed by means of the handles 18. A rethermalizer according to the present invention can reheat most foods from 45 degrees to 165 degrees Fahrenheit within 55 to 60 minutes, which is significantly faster than required by regulations. The food pouches may then be opened and the food served in the usual manner. The racks 10 may then be reloaded with new food pouches and the process repeated.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. An expansible rethermalizer rack comprising:
   a bottom member having first and second edges;
   first and second side members having upper and lower end portions, wherein the lower end portions are respectively connected to the first and second edges of said bottom member to define a pouch receiving space between the first and second side members and wherein at least one of the first and second side members is pivotally connected to the respective one of said first and second edges;
   a first pair of support members connected to the upper end portion of the first side member; and
   a second pair of support members connected to the upper end portion of the second side member;
   whereby the rack may be suspended from the pairs of support members with the upper end portions of the side members spaced apart and at least one of the side members may be pivotally moved with respect to the other side member to vary the size of the pouch receiving space for accommodating variously sized food packages.

2. The rack of claim 1 wherein the lower end portions of both the first and second side members are pivotally connected to the respective first and second edges of the bottom member.

3. The rack of claim 2 wherein the side members have passages for the circulation of liquid through the pouch receiving space.

4. The rack of claim 3 wherein each side member further comprises a plurality of spaced apart slats.

5. The rack of claim 4 wherein the bottom member has an aperture for the circulation of liquid through the pouch receiving space.

6. The rack of claim 1 further comprising a first handle attached to the upper end portion of the first side member and a second handle attached to the upper end portion of the second side member.

7. The rack of claim 6 wherein each handle comprises a metal rod and the support members for each side member comprise opposite ends of the metal rod.

8. The rack of claim 7 wherein at least a portion of each metal rod is coated with a thermally insulating material.

9. The rack of claim 1 further comprising a tracking member mounted adjacent the upper end portion of one of said side members, the tracking member having an indicium for tracking the amount of time the rack has been in a rethermalizer.

10. The rack of claim 2 wherein the bottom member further comprises two sections pivotally connected along a line extending between and parallel to the first and second edges.

11. A rethermalizer unit for reheating foods packaged in vacuum sealed pouches, the rethermalizer unit comprising:
   a housing;
   a reservoir mounted within the housing and having an accessible open top end with a perimeter;
   a heater for heating water contained within the reservoir; and
   an upstanding rail extending along at least a portion of the perimeter, the rail including a plurality of notches disposed adjacent at least a portion of the perimeter of the open top end of the reservoir.

12. A rethermalizer unit for reheating foods packaged in sealed pouches, comprising:
   a housing;
   a reservoir mounted within the housing and having an accessible open top end with a perimeter;
   a heater for heating water contained within the reservoir;
   a plurality of notches disposed adjacent at least a portion of the perimeter of the open top end of the reservoir; and
   a rack suspended within the reservoir, the rack having a pair of side members and a bottom member, each side member having a lower end portion pivotally connected to the bottom member, each side member including a pair of oppositely disposed support pins connected to opposite sides of an upper end portion of the side member, the support pins for each side member being supported within selected notches adjacent opposite sides of the reservoir.

13. The rethermalizer unit of claim 12 further comprising a pump connected for fluid communication with said reservoir for circulating water within said reservoir.

14. A rethermalizer unit for reheating foods packaged in sealed pouches, comprising:
   a housing:
   a reservoir mounted within the housing and having an accessible open top end with a perimeter;
   a heater for heating water contained within the reservoir;
   a plurality of notches disposed adjacent at least a portion of the perimeter of the open top end of the reservoir; and a rail traversing the open top end of the reservoir, the rail having a plurality of spaced apart notches for holding racks within said reservoir.

15. The rethermalizer of claim 12 further comprising a rail traversing the open top end of the reservoir, the rail having a plurality of spaced apart notches for holding a plurality of said racks within said reservoir.

16. The rethermalizer of claim 13 further comprising a rail traversing the open top end of the reservoir, the rail having a plurality of spaced apart notches.

17. A rethermalizer unit for reheating foods packaged in vacuum sealed pouches, the rethermalizer unit comprising:
a housing;
a reservoir mounted within the housing and having an accessible open top end with a perimeter;
a heater for heating water contained within the reservoir;
a plurality of notches disposed adjacent at least a portion of the perimeter of the open top end of the reservoir; and
a rack suspended within the reservoir, the rack including:
a bottom member having first and second edges;
first and second side members having upper and lower end portions, wherein the lower end portions are respectively connected to the first and second edges of said bottom member to define a pouch receiving space between the first and second side members and wherein at least one of the first and second side members is pivotally connected to the respective one of said first and second edges;
a first pair of support members connected to the upper end portion of the first side member; and
a second pair of support members connected to the upper end portion of the second side member;
the rack being suspended from the pairs of support members with the support members resting within selected ones of the notches adjacent the perimeter of the reservoir and with the upper end portions of the side members spaced apart, whereby at least one of the side members may be pivotally moved with respect to the other side member to vary the size of the pouch receiving space for accommodating variously sized food packages.

18. The rethermalizer of claim 17 further comprising a rail traversing the open top end of the reservoir, the rail having a plurality of spaced apart notches for holding racks within said reservoir.

19. The rethermalizer of claim 18 further comprising a second rack suspended within the reservoir with the support members on one side of the second rack being supported by the rail.

20. The rethermalizer of claim 19 wherein each rack has the lower end portions of both the first and second side members pivotally connected to the respective first and second edges of the bottom member.

21. The rethermalizer of claim 20 wherein the side and bottom members of each rack have passages for the circulation of liquid through the pouch receiving space.

22. The rethermalizer of claim 21 wherein each rack further includes a first handle attached to the upper end portion of the first side member and a second handle attached to the upper end portion of the second side member.

23. The rethermalizer of claim 22 wherein each handle comprises a metal rod and the support members for each side member comprise opposite ends of the metal rod.

24. The rethermalizer of claim 23 wherein at least a portion of each metal rod is coated with a thermally insulating material.

25. The rethermalizer of claim 24 wherein each rack further includes a tracking member mounted adjacent the upper end portion of one of said side members, the tracking member having an indicium for tracking the amount of time the rack has been in the rethermalizer.

26. An expansible rethermalizer rack, comprising:
a bottom member having first and second edges;
first and second side members each having upper and lower end portions, the lower end portions being respectively connected to the first and second edges of the bottom member to define a pouch-receiving space between the first and second side members, at least one of the first and second side members being pivotally connected to the respective one of said first and second edges by a hinge including a hinge pin;
a first pair of support members connected to the upper end portion of the first side member; and
a second pair of support members connected to the upper end portion of the second side member;
whereby the rack may be suspended from the pairs of support members with the upper end portions of the side members spaced apart and at least one of the side members may be pivotally moved with respect to the other side member to vary the size of the pouch receiving space for accommodating variously sized food packages.

* * * * *